United States Patent
Kuhara

(10) Patent No.: US 10,119,887 B2
(45) Date of Patent: Nov. 6, 2018

(54) THERMOSTAT MALFUNCTION DETECTION DEVICE

(71) Applicant: FUJI JUKOGYO KABUSHIKI KAISHA, Tokyo (JP)

(72) Inventor: Masaki Kuhara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 39 days.

(21) Appl. No.: 15/392,308

(22) Filed: Dec. 28, 2016

(65) Prior Publication Data

US 2017/0227421 A1 Aug. 10, 2017

(30) Foreign Application Priority Data

Feb. 4, 2016 (JP) ................................. 2016-019466

(51) Int. Cl.
*G01M 15/04* (2006.01)
*F01P 11/16* (2006.01)

(52) U.S. Cl.
CPC ........... *G01M 15/048* (2013.01); *F01P 11/16* (2013.01); *F01P 2031/32* (2013.01)

(58) Field of Classification Search
CPC ..... G01M 15/048; F01P 11/16; F01P 2031/32
See application file for complete search history.

(56) References Cited

U.S. PATENT DOCUMENTS

| | | | |
|---|---|---|---|
| 6,732,025 B2 * | 5/2004 | Reese, II | F01P 11/14 701/29.9 |
| 7,343,752 B2 * | 3/2008 | Nishiwaki | F01P 11/16 123/41.15 |
| 7,524,106 B2 * | 4/2009 | Higashiyama | F01P 11/16 123/41.05 |
| 7,918,129 B2 * | 4/2011 | Coppola | F01P 11/16 73/114.68 |
| 8,122,858 B2 * | 2/2012 | Fujimoto | F01P 11/16 123/41.1 |
| 9,534,527 B2 * | 1/2017 | Sakayori | F01P 11/16 |
| 9,605,584 B2 * | 3/2017 | Nethercutt | F01P 7/16 |
| 2012/0106590 A1 * | 5/2012 | Suzuki | F01P 11/16 374/1 |
| 2015/0088364 A1 | 3/2015 | Sakayori et al. | |

FOREIGN PATENT DOCUMENTS

WO 2013/168529 A 11/2013

* cited by examiner

*Primary Examiner* — Freddie Kirkland, III
(74) *Attorney, Agent, or Firm* — Chip Law Group

(57) ABSTRACT

A thermostat malfunction detection device that detects a stuck open state of a thermostat includes: an estimated water temperature calculation module that calculates an estimated water temperature of a cooling water based on an operation state of an engine; an actual water temperature detection unit that detects an actual water temperature of the cooling water; a first determination module that establishes preliminary determination when an amount of change of a difference between the estimated water temperature and the actual water temperature within a determined period is equal to or larger than a first threshold value; a passing air amount control module that increases a passing air amount, when the preliminary determination is established; and a second determination module that establishes malfunction determination, when the difference is equal to or larger than a second threshold value, after the passing air amount has been increased.

9 Claims, 4 Drawing Sheets

THERMOSTAT MALFUNCTION DETECTION DEVICE

CROSS-REFERENCE TO RELATED APPLICATIONS

The present application claims priority from Japanese Patent Application No. 2016-019466 filed on Feb. 4, 2016, the entire contents of which are hereby incorporated by reference.

BACKGROUND

1. Technical Field

The present invention relates to a thermostat malfunction detection device that detects a stuck open state of a thermostat that opens and closes a cooling water flow channel between a water-cooled engine and a radiator, and particularly relates to a thermostat malfunction detection device that improves malfunction detection accuracy.

2. Related Art

In a water-cooled engine that is mounted on a vehicle such as a passenger vehicle for example, cooling water that cools a cylinder head, a cylinder liner, and the like of an engine is circulated in a radiator which is a heat exchanger, and is cooled by heat exchange with traveling wind. Also, this engine includes a thermostat that closes a flow channel to stop water supply to the radiator when cooling water temperature is equal to or lower than a predetermined temperature, for the purpose of warming up air after cold start. When the thermostat malfunctions to be stuck in an open state, a time taken to warm up the air becomes long excessively, and the malfunction becomes a cause of a trouble that is referred to as overcool in which the cooling water temperature is operated by a lower temperature than a usual water temperature.

For example, WO2013/168529A1 describes calculating a malfunction-time highest water temperature and a normal-time lowest water temperature on the basis of an engine speed, an engine load, a vehicle speed, an outside air temperature, etc. and comparing these calculated values with an actual engine water temperature, as a past technology relevant to malfunction detection of the thermostat.

In recent years, an active grill shutter is proposed which reduces air resistance of the vehicle by closing a part of a grill (a duct) that introduces traveling wind from outside the vehicle into a radiator by means of a shutter in order to improve fuel efficiency, when a cooling request is not severe comparatively. The shutter is normally closed while warming up the engine in the vehicle that includes this active grill shutter, and thus a passing air amount of the radiator is reduced. In this case, even when the malfunction of thermostat stuck open occurs, a water temperature difference from a normal time becomes smaller, and thus the malfunction is unable to be detected in some cases.

SUMMARY OF THE INVENTION

It is desirable to provide a thermostat malfunction detection device that improves malfunction detection accuracy.

The present invention solves the above problem by the solution below.

An aspect of the present invention provides a thermostat malfunction detection device that detects a stuck open state of a thermostat that opens and closes a cooling water flow channel between a radiator including a passing air amount changing unit that increases and decreases a passing air amount and an engine, according to a temperature of a cooling water, including: an estimated water temperature calculation module that calculates an estimated water temperature of the cooling water on the basis of an operation state of the engine; an actual water temperature detection unit that detects an actual water temperature of the cooling water; a first determination module that establishes preliminary determination when an amount of change of a difference between the estimated water temperature and the actual water temperature within a predetermined period during cooling water temperature rising is equal to or larger than a first threshold value; a passing air amount control module that controls the passing air amount changing unit to increase a passing air amount, when the first determination module establishes the preliminary determination; and a second determination module that establishes malfunction determination, when the difference between the estimated water temperature and the actual water temperature has become equal to or larger than a second threshold value, after the passing air amount control module has increased the passing air amount.

The passing air amount changing unit may include a shutter that opens and closes at least a part of an air flow channel that introduces traveling wind from outside a vehicle body, and the passing air amount control module may set the shutter in an open state, in response to establishment of the preliminary determination.

The passing air amount changing unit may include an electric fan disposed to face the radiator, and the passing air amount control module may set the electric fan in a blowing state, in response to establishment of the preliminary determination.

The first determination module may establish the preliminary determination, only when a state in which a traveling speed of a vehicle is equal to or higher than a predetermined value has continued for a preset period or more.

DETAILED DESCRIPTION

Figure 1:
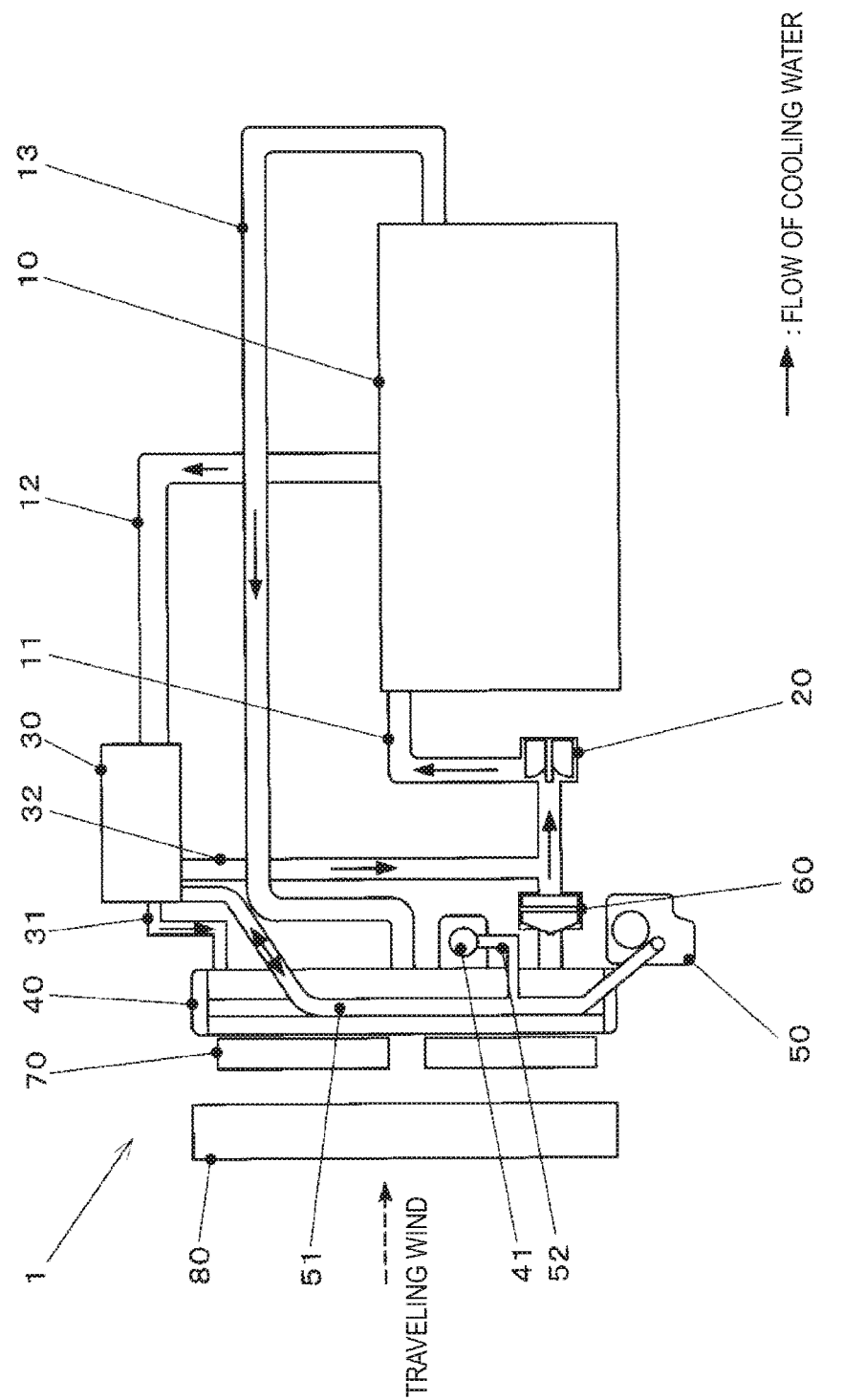
FIG. 1 is a diagram illustrating a configuration of an engine cooling system of a vehicle provided with an implementation of a thermostat malfunction detection device that employs the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

The present invention achieves the objective of providing the thermostat malfunction detection device that improves the malfunction detection accuracy, by creating a state in which a water temperature difference between a normal time and a stuck open malfunction time is increased by setting a grill shutter in an open state forcibly, when an increase rate of an actual water temperature is made discrepant in relation to an increase rate of an estimated water temperature estimated on the basis of an operation state of an engine, and definitively diagnosing a stuck open malfunction of a thermostat when a difference between subsequent estimated water temperature and actual water temperature is large.

[Implementation]

In the following, an implementation of a thermostat malfunction detection device that employs the present invention will be described. The thermostat malfunction detection device of the implementation is provided in a water-cooled gasoline engine that is mounted as a power source for traveling on a vehicle such as a passenger vehicle, for example.

FIG. 1 is a diagram illustrating a configuration of an engine cooling system of a vehicle provided with the thermostat malfunction detection device of the implementation. The cooling system 1 of the implementation forcibly circulates cooling water which is long-life coolant including water as a principal component to which ethylene glycol for increasing antifreeze property, anti-corrosive, defoamer, etc. are added, in a water jacket formed in a cylinder head and a cylinder liner of an engine 10 in order to cool these. The cooling system 1 that cools the engine 10 and other components includes a water pump 20, a filler tank 30, a radiator 40, a reservoir tank 50, a thermostat 60, an electric fan 70, a grill shutter 80, etc.

The engine 10 is a horizontally opposed four-cylinder four-stroke gasoline direct-injection engine as an example, but a cylinder layout, a cylinder number and the like are not limited thereto particularly. The engine 10 includes an inlet pipe arrangement 11, outlet pipe arrangements 12, 13, etc. The inlet pipe arrangement 11 is a pipe line that introduces the cooling water discharged by the water pump 20 into a cooling water flow channel at an inner portion of the engine 10. The cooling water that is introduced into main machinery of the engine 10 sequentially passes through the water jacket formed in the cylinder head and the cylinder liner to cool the cylinder head, the cylinder liner, etc., and thereafter is ejected by the outlet pipe arrangements 12, 13. The outlet pipe arrangements 12, 13 are pipe lines that convey the cooling water that is ejected from the cooling water flow channel of the engine 10, to each of the filler tank 30 and the radiator 40.

The water pump 20 pressurizes and discharges the cooling water, and forcibly circulates the cooling water of the cooling system 1 inner portion. The water pump 20 is attached to a cylinder block of the engine 10, and is driven in conjunction with a crank shaft via a timing chain or the like. A discharge port of the water pump 20 is coupled to the inlet pipe arrangement 11 of the engine 10.

The filler tank 30 is a reservoir in which the cooling water that is introduced from the outlet pipe arrangement 12 of the engine 10 is accumulated temporarily. An outlet pipe arrangement 31 and a bypass pipe arrangement 32 are provided in the filler tank 30. The outlet pipe arrangement 31 is a pipe line that introduces the cooling water that has gone out from the filler tank 30 into the radiator 40. The bypass pipe arrangement 32 is a pipe line that flows the cooling water that has gone out from the filler tank 30, back to an inlet of the water pump 20, without passing the cooling water through the radiator 40.

The radiator 40 is a heat exchanger that cools the cooling water by heat exchange with traveling wind. In the radiator 40, a pair of tanks that are provided an inlet side and an outlet side respectively are in communication with each other via a large number of finned tubes, and the cooling water passes inside the finned tubes, and thereby the heat of the cooling water is released from the fins.

The reservoir tank 50 receives the cooling water that overflows from the filler tank 30 and a radiator cap 41 of the radiator 40 which is introduced via reservoir pipe arrangements 51, 52, and accumulates this temporarily.

The thermostat 60 is provided at a part of the flow channel that flows the cooling water that has gone out from the radiator 40 back to the water pump 20, and closes the flow channel to practically stop the flow of the cooling water that passes through the radiator 40 when the cooling water temperature is a low temperature. The thermostat 60 includes a valve that opens and closes the flow channel and a spring that presses the valve to a valve closing side. The thermostat 60 also includes a closed wax pellet that expands as the cooling water temperature rises, and the valve is driven to a valve opening side by expansion of the wax pellet, and opens the flow channel. With the above configuration, at a normal time, the thermostat 60 closes the flow channel when the cooling water temperature is lower than a predetermined valve opening temperature, and opens the flow channel when the cooling water temperature is equal to or higher than the predetermined valve opening temperature. The valve opening temperature is set to approximately 80° C., for example.

The electric fan 70 is a blower that forcibly blows wind to the radiator 40, by rotating a blower fan disposed to face the radiator 40 by means of an electric fan motor 142 (refer to FIG. 2) which is an electrically driven motor. At a normal time, the electric fan 70 is actuated when the cooling water temperature exceeds a predetermined threshold value (for example, approximately 96° C.).

The grill shutter 80 opens and closes a grill opening that introduces the traveling wind which is the airflow that occurs at the time of traveling of the vehicle into the radiator 40, by means of a movable flap driven by a shutter actuator 141 (refer to FIG. 2) which is an electric actuator. The grill shutter 80 improves the fuel efficiency by reducing the air resistance coefficient Cd of the vehicle body, by closing a part or all of the grill opening, when the cooling water temperature is at a predetermined low temperature, or when the loads of the engine 10 and an air conditioner (not depicted) are low, and the cooling request is low comparatively.

Figure 2:
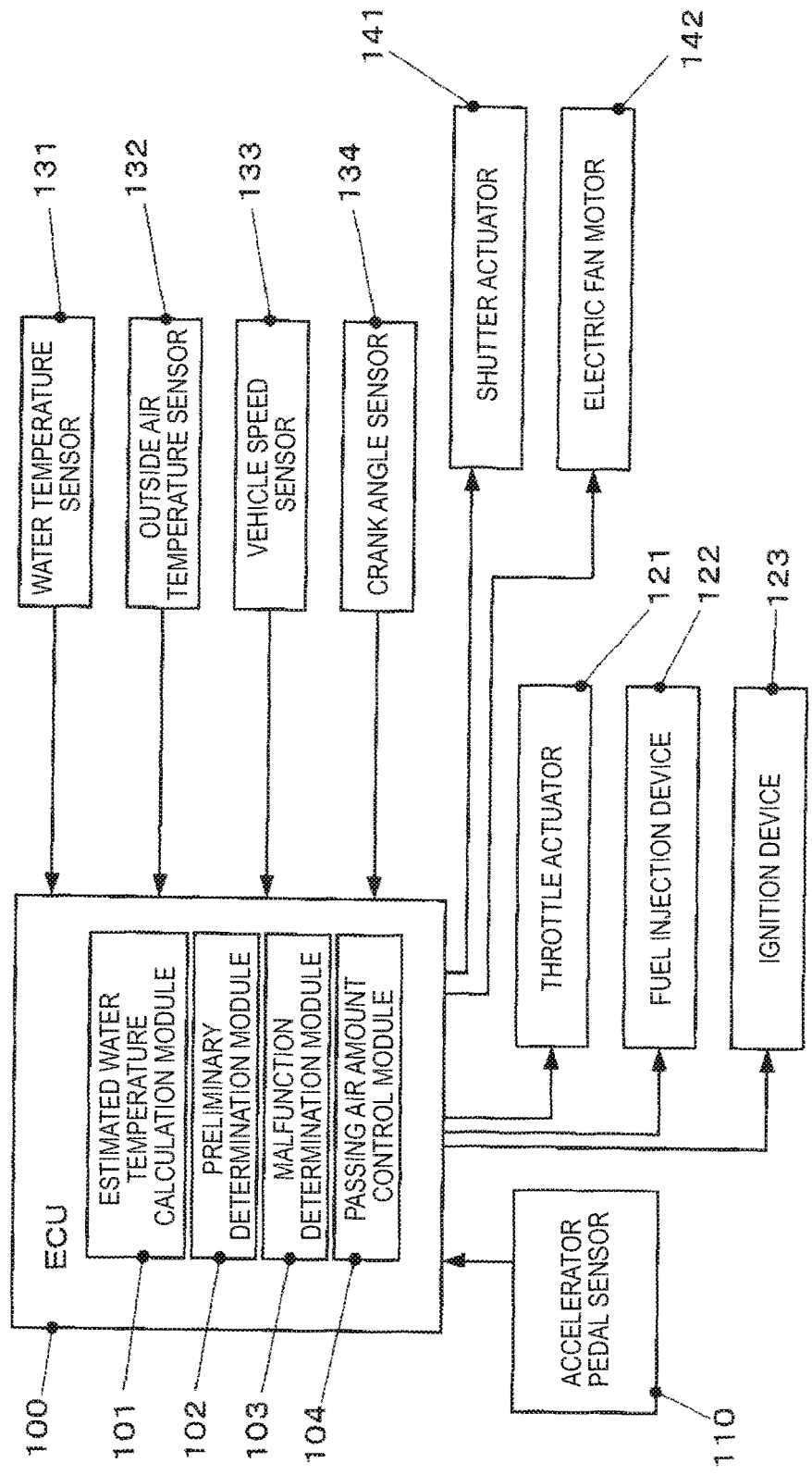
FIG. 2 is a block diagram illustrating a configuration of a thermostat malfunction detection device of an implementation.

FIG. 2 is a block diagram illustrating a configuration of the thermostat malfunction detection device of the implementation. The thermostat malfunction detection device includes an engine control unit (an ECU) 100. The ECU 100 controls the engine 10 and auxiliary machinery overall. The ECU 100 includes an information processor such as a CPU, a storage such as a RAM and a ROM, an input-output interface, and, a bus that couples these components, for example. The ECU 100 calculates a driver request torque on the basis of a depression amount of an accelerator pedal detected by an accelerator pedal sensor 110, and controls a throttle actuator 121, a fuel injection device 122, an ignition device 123, and the like, so that the actual torque that is generated by the engine 10 gets close to the driver request torque, in order to adjust the output of the engine 10.

Also, the ECU 100 includes an estimated water temperature calculation module 101, a preliminary determination module 102, a malfunction determination module 103, a passing air amount control module 104, etc. Each of these modules may be configured with individual hardware that is provided for each module, and may be configured as software by utilizing common hardware such as a CPU.

The estimated water temperature calculation module 101 estimates the temperature of the cooling water when the cooling system is normal, on the basis of the operation state of the vehicle and the engine 10. For example, the estimated water temperature calculation module 101 estimates a heat input amount (a heat generation amount of the engine) into the cooling water on the basis of the history of an intake air amount and a rotation speed of the engine 10, and estimates the temperature of the cooling water by subtracting a heat release amount from the cooling water that is estimated on the basis of an outside air temperature and a vehicle speed from the heat input amount. A formula for calculating the estimated water temperature from these parameters can be obtained by an experiment that uses an actual device, or simulation, for example.

The preliminary determination module 102 performs preliminary determination that determines a state in which a stuck open malfunction of the thermostat 60 is concerned, on the basis of the change rate (the slope of the water temperature) of the water temperature in a unit time when the temperature of the cooling water rises from an ordinary temperature (ambient temperature) to a normal time valve opening temperature of the thermostat 60, after the cold start of the engine 10. When the preliminary determination by the preliminary determination module 102 is established, the malfunction determination module 103 performs malfunction determination as definitive diagnosis, on the basis of the discrepancy between the estimated temperature and the actual temperature of the cooling water. The passing air amount control module 104 controls the shutter actuator 141, the electric fan motor 142, and switches between opening and closing of the grill shutter 80 and between on and off of the electric fan 70. These operation and function will be described in detail later.

The accelerator pedal sensor 110 includes a position encoder for detecting an operation amount (a depression amount) of the accelerator pedal to which a driver performs accelerating operation. The throttle actuator 121 is an electric actuator that drives, for opening and closing, the throttle valve that controls the intake air amount of the engine 10, according to a command from the ECU 100. The fuel injection device 122 is provided in each cylinder of the engine 10, and includes an injector that injects fuel spray in the cylinder, and a fuel supply unit that supplies pressurized fuel to the injector. The fuel injection device 122 injects a predetermined injection amount of fuel in each cylinder at a predetermined injection time, in accordance with the command from the ECU 100. The ignition device 123 supplies an ignition signal (ignition voltage) to an ignition plug of each cylinder, in accordance with the command from the ECU 100.

Also, various types of sensors, such as a water temperature sensor 131, an outside air temperature sensor 132, a vehicle speed sensor 133, and a crank angle sensor 134, are coupled to the ECU 100, so that the outputs of these sensors are input and processed. The water temperature sensor 131 detects the temperature of the cooling water that has gone out from the engine 10. The outside air temperature sensor 132 detects outside air temperature (ambient temperature) around the vehicle. The vehicle speed sensor 133 outputs a pulse signal of a frequency that is substantially proportional to a rotational speed of a wheel. The ECU 100 calculates the traveling speed of the vehicle, according to the pulse signal output by the vehicle speed sensor 133. The crank angle sensor 134 outputs a pulse signal of a frequency that is substantially proportional to a rotational speed of the crank shaft which is an output shaft of the engine 10. The ECU 100 calculates the traveling speed of the vehicle, according to the pulse signal output by the crank angle sensor 134.

Also, the ECU 100 controls the operation of the shutter actuator 141 and the electric fan motor 142. The shutter actuator 141 is an electric actuator that opens and closes the grill shutter 80. The electric fan motor 142 drives the rotation of the blower fan of the electric fan 70.

Figure 3:
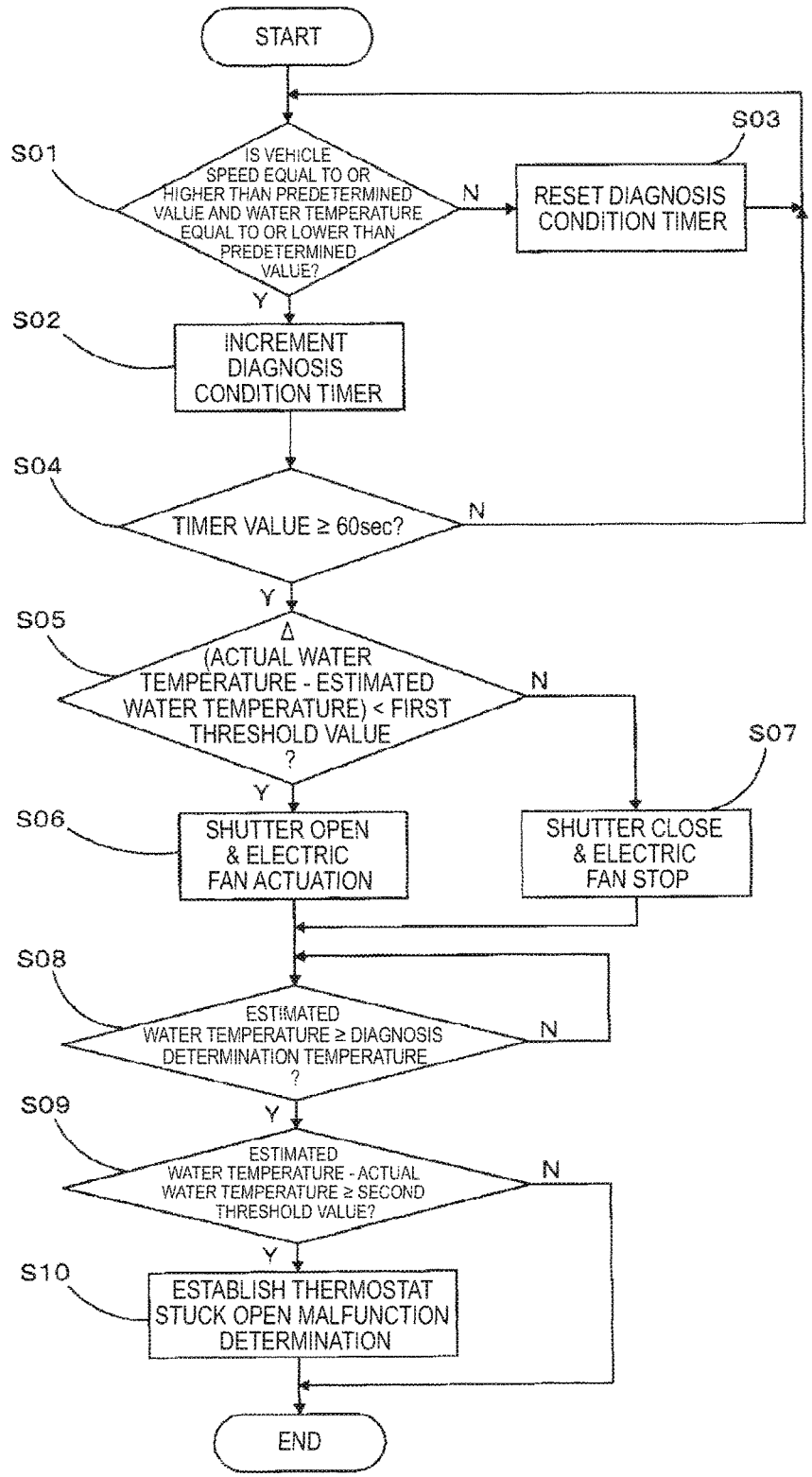
FIG. 3 is a flowchart illustrating an operation of a thermostat malfunction detection device of an implementation.

FIG. 3 is a flowchart illustrating operation of the thermostat malfunction detection device of the implementation. In the following, each step will be described sequentially.

<Step S01: Vehicle Speed and Water Temperature Judgment>

The ECU 100 determines whether the current vehicle speed is equal to or higher than a predetermined value and the temperature of the cooling water that is detected by the water temperature sensor 131 is equal to or lower than a predetermined value. This predetermined value is set to the valve opening temperature or lower at a normal time of the thermostat 60, for example. If the vehicle speed is equal to or higher than the predetermined value and the water temperature is equal to or lower than the predetermined value, an execution condition of preliminary diagnosis is satisfied, and the process proceeds to step S02. In the other case, the process proceeds to step S03.

<Step S02: Diagnosis Condition Timer Increment>

The ECU 100 increments a timer value of a diagnosis condition timer which is a timer that measures a continuing duration of a state that satisfies the execution condition of the preliminary diagnosis. Thereafter, the process proceeds to step S04.

<Step S03: Diagnosis Condition Timer Reset>

The ECU 100 resets the timer value of the diagnosis condition timer, and thereafter returns to step S01 to repeat the following process.

<Step S04: Timer Value Judgment>

The ECU 100 determines whether the timer value of the diagnosis condition timer is equal to or larger than a preset threshold value (for example, 60 seconds). If the timer value is equal to or larger than the threshold value, the process proceeds to step S05, and in the other case, the process returns to step S01 to repeat the following process.

<Step S05: Judgment of Change of Difference Between Actual Water Temperature and Estimated Water Temperature>

The preliminary determination module 102 of the ECU 100 compares the amount of change (preliminary diagnosis determination value), in a predetermined time, of the difference that is obtained by subtracting the water temperature (estimated water temperature) estimated by the estimated water temperature calculation module 101 from the actual water temperature (actual water temperature) that is detected by the water temperature sensor 131, with a preset first threshold value. If the preliminary diagnosis determination value is smaller than the first threshold value, it is highly possible that the thermostat 60 malfunctions to be stuck open, and the preliminary diagnosis is established, and the process proceeds to step S06. In the other case, the process proceeds to step S07.

<Step S06: Shutter Open and Electric Fan Actuation>

The passing air amount control module 104 of the ECU 100 actuates the shutter actuator 141 and the electric fan motor 142, and shifts the grill shutter 80 from a closed state to an open state, and starts blowing by the electric fan 70, and increases the passing air amount of the radiator 40. Thereafter, the process proceeds to step S08.

<Step S07: Shutter Close and Electric Fan Stop>

The passing air amount control module 104 of the ECU 100 maintains the grill shutter 80 in a closed state, and the electric fan 70 in a stop (off) state. Thereafter, the process proceeds to step S08.

<Step S08: Diagnosis Determination Temperature Judgment>

The ECU 100 compares the estimated water temperature estimated by the estimated water temperature calculation module 101 with a preset diagnosis determination temperature (for example, approximately 80° C.). If the estimated water temperature is equal to or higher than the diagnosis determination temperature, the process proceeds to step S09, and in the other case, step S08 is repeated until the estimated water temperature reaches the diagnosis determination temperature.

<Step S09: Judgment of Difference Between Estimated Water Temperature and Actual Water Temperature>

The malfunction determination module 103 of the ECU 100 compares the difference (discrepancy amount between the estimated water temperature and the actual water temperature) that is obtained by subtracting the water temperature (estimated water temperature) estimated by the estimated water temperature calculation module 101 from the actual water temperature (actual water temperature) that is detected by the water temperature sensor 131, with a preset second threshold value. If the difference is equal to or larger than the second threshold value, the process proceeds to step S10, and in the other case, a series of processes end (return).

<Step S10: Malfunction Determination Establishment>

The malfunction determination module 103 of the ECU 100 establishes stuck open malfunction determination of the thermostat 60. Thereafter, a series of processes end.

Figure 4:
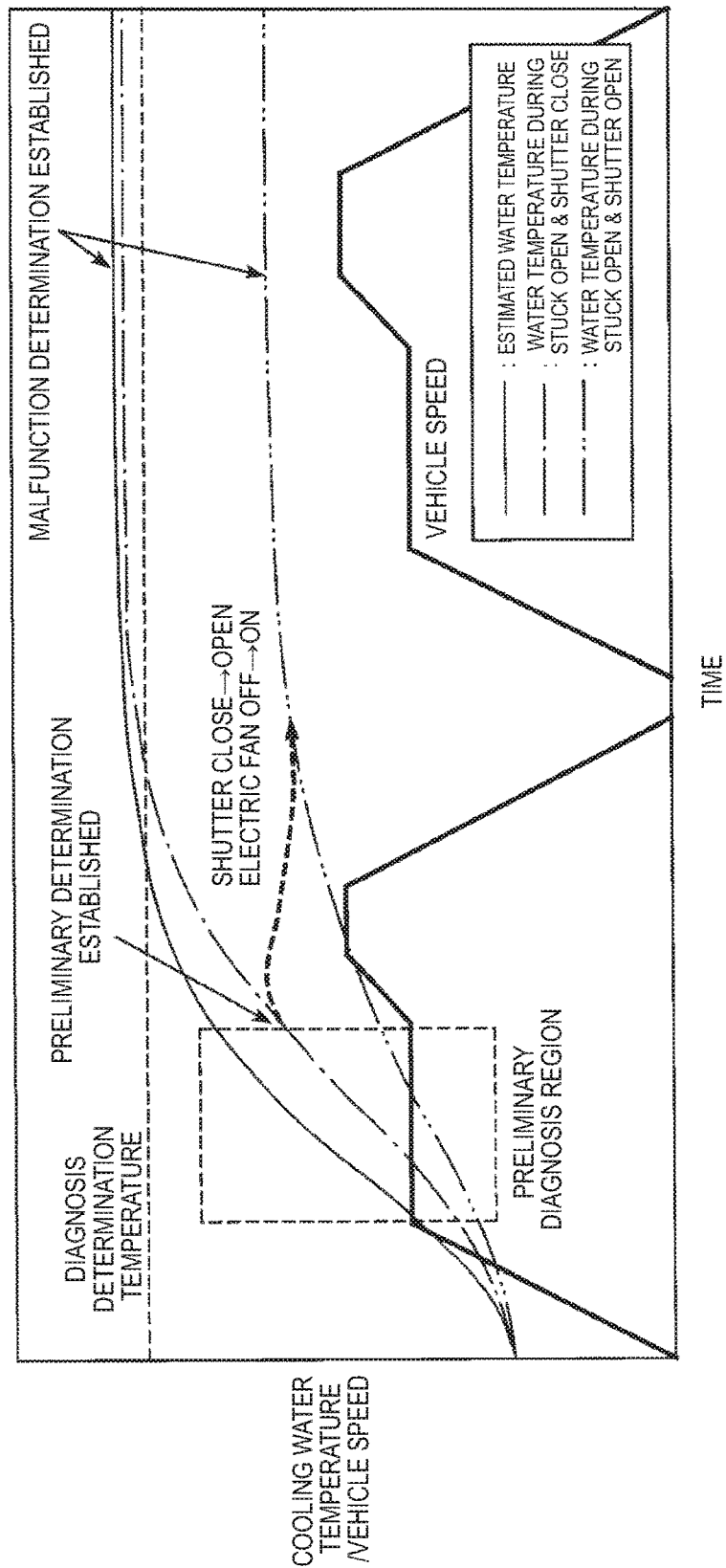
FIG. 4 is a graph illustrating an example of transition of vehicle speed and cooling water temperature after an engine start.

FIG. 4 is a graph illustrating an example of transition of the cooling water temperature after engine start. In FIG. 4, the horizontal axis indicates time after engine start, and the vertical axis indicates vehicle speed and cooling water temperature. The solid line indicates estimated water temperature when the cooling system 1 is normal. Note that, when the cooling system 1 is normal, the actual water temperature is also substantially identical with this estimated water temperature. The alternate long and short dash line indicates actual water temperature in a state in which the thermostat 60 malfunctions to be stuck open and the grill shutter 80 closes and the electric fan 70 is turned off. The alternate long and two short dashes line illustrates actual water temperature in a state in which the thermostat 60 malfunctions to be stuck open and the grill shutter 80 opens and the electric fan 70 is turned on. The solid thick line indicates vehicle speed.

As illustrated in FIG. 4, even if the stuck open malfunction of the thermostat 60 occurs in the state in which the grill shutter 80 is closed, the cooling water temperature gets close to the estimated water temperature ultimately, and thus the malfunction is unable to be detected only by the difference between the estimated water temperature and the actual water temperature, in some cases. With regard to this point, according to the present implementation, a state of high possibility of the stuck open malfunction of the thermostat 60 is determined (preliminary determination) on the basis of difference of a temperature change rate per time (the slope in FIG. 4) within a period during the cooling water temperature rising (a region in the dashed line rectangle in FIG. 4), and the grill shutter 80 is opened and the electric fan 70 is turned on, and thereby the passing air amount to the radiator 40 is increased to create a state in which the water temperature discrepancy between a normal state and a malfunction state becomes larger, so that the stuck open malfunction of the thermostat 60 can be detected appropriately.

As described above, according to the implementation, when the preliminary determination is established on the basis of the temperature change rate during temperature rising of the cooling water immediately after the start of the engine 10, the grill shutter 80 is opened, and the electric fan 70 is actuated, and the malfunction determination is performed in a state in which the passing air amount to the radiator 40 is increased, and thereby the stuck open malfunction of the thermostat 60 can be detected accurately even in a vehicle including the grill shutter 80.

(Exemplary Variant)

The present invention is not limited to the implementation described above, but can be modified and altered variously, and those modification and alteration are also within the technical scope of the present invention.

(1) The configurations of the thermostat malfunction detection device and the engine provided with this thermostat malfunction detection device are not limited to the above implementation, but can be changed as appropriate. For example, the engine is a gasoline engine in the implementation, but any type of water-cooled internal combustion engine, such as a spark-ignited engine that uses fuel other than gasoline, a diesel engine, an engine that performs HCCl combustion, can employ the present invention.

(2) The cooling system of engine is not limited to the configuration of the implementation, and can be changed as appropriate. For example, there may be provided a flow channel for circulating the cooling water in a supercharger such as a turbocharger, a water-cooled oil cooler, a water-cooled intercooler, a heater core, and the like.

(3) In the implementation, both of the grill shutter and the electric fan are used to increase the passing air amount of the radiator, but the present invention can also be applied to a vehicle that does not have the grill shutter. In this case, the passing air amount of the radiator can be increased by the electric fan.

When the amount of change of the difference between the estimated water temperature and the actual water temperature within a predetermined period during the cooling water temperature rising is equal to or larger than the first threshold value, the preliminary determination is established because it is highly possible that the malfunction of the thermostat stuck open has occurred, and the passing air amount to the radiator is increased to create a state of a large water temperature discrepancy between a normal time and a malfunction time, and thereafter the difference between the estimated water temperature and the actual water temperature are compared with the second threshold value to perform malfunction determination, and thereby the detection accuracy of the malfunction of the thermostat stuck open can be improved even in the vehicle provided with the radiator passing air amount changing unit.

It is possible to unfailingly obtain the effect described above by increasing the passing air amount to the radiator at the time of the establishment of the preliminary determination.

The accuracy of the ultimate malfunction determination can be improved more, by improving the accuracy of the preliminary determination.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A thermostat malfunction detection device that detects a stuck open state of a thermostat that opens and closes a cooling water flow channel between a radiator including a passing air amount changing unit that increases and decreases a passing air amount and an engine, according to a temperature of a cooling water, comprising:
   an estimated water temperature calculation module that is configured to calculate an estimated water temperature of the cooling water based on an operation state of the engine;
   an actual water temperature detection unit that is configured to detect an actual water temperature of the cooling water;
   a first determination module that is configured to establish preliminary determination based on an amount of change of a difference between the estimated water temperature and the actual water temperature within a predetermined period during cooling water temperature rising is equal to or larger than a first threshold value;
   a passing air amount control module that is configured to control the passing air amount changing unit to increase a passing air amount, based on establishment of the preliminary determination by the first determination module; and
   a second determination module that is configured to establish malfunction determination, based on the difference between the estimated water temperature and the actual water temperature being equal to or larger than a second threshold value, after the passing air amount control module has increased the passing air amount.

2. The thermostat malfunction detection device according to claim 1, wherein
   the passing air amount changing unit includes a shutter that is configured to open and close at least a part of an air flow channel that introduces traveling wind from outside a vehicle body, and
   the passing air amount control module is further configured to set the shutter in an open state based on establishment of the preliminary determination.

3. The thermostat malfunction detection device according to claim 1, wherein
   the passing air amount changing unit includes an electric fan disposed to face the radiator, and
   the passing air amount control module is further configured to set the electric fan in a blowing state based on establishment of the preliminary determination.

4. The thermostat malfunction detection device according to claim 2, wherein
   the passing air amount changing unit includes an electric fan disposed to face the radiator, and
   the passing air amount control module is further configured to set the electric fan in a blowing state based on establishment of the preliminary determination.

5. The thermostat malfunction detection device according to claim 1, wherein
   the first determination module is further configured to establish the preliminary determination, based on a state in which a traveling speed of a vehicle is equal to or higher than a determined value that continues for at least a preset period.

6. The thermostat malfunction detection device according to claim 2, wherein
   the first determination module is further configured to establish the preliminary determination, based on a state in which a traveling speed of a vehicle is equal to or higher than a determined value that continues for at least a preset period.

7. The thermostat malfunction detection device according to claim 3, wherein
   the first determination module is further configured to establish the preliminary determination, based on a state in which a traveling speed of a vehicle is equal to or higher than a determined value that continues for at least a preset period.

8. The thermostat malfunction detection device according to claim 4, wherein
   the first determination module is further configured to establish the preliminary determination, based on a state in which a traveling speed of a vehicle is equal to or higher than a determined value that continues for at least a preset period.

9. A thermostat malfunction detection device that detects a stuck open state of a thermostat that opens and closes a cooling water flow channel between a radiator including a passing air amount changing unit that increases and decreases a passing air amount and an engine, according to a temperature of a cooling water, comprising:
   an actual water temperature detection unit that is configured to detect an actual water temperature of the cooling water; and
   circuitry configured to:
      calculate an estimated water temperature of the cooling water based on an operation state of the engine,
      establish preliminary determination based on an amount of change of a difference between the estimated water temperature and the actual water temperature within a determined period during rise of cool water temperature is equal to or larger than a first threshold value,
      control the passing air amount changing unit to increase a passing air amount, based on establishment of the preliminary determination, and
      establish malfunction determination, based on the difference between the estimated water temperature and the actual water temperature being equal to or larger than a second threshold value, after the passing air amount has increased.

* * * * *